April 23, 1957  E. H. SONNANSTINE, JR., ET AL  2,789,644
CONTROL CIRCUIT FOR SEQUENTIALLY OPERATED DEVICE
Filed Jan. 27, 1956                                      2 Sheets-Sheet 2
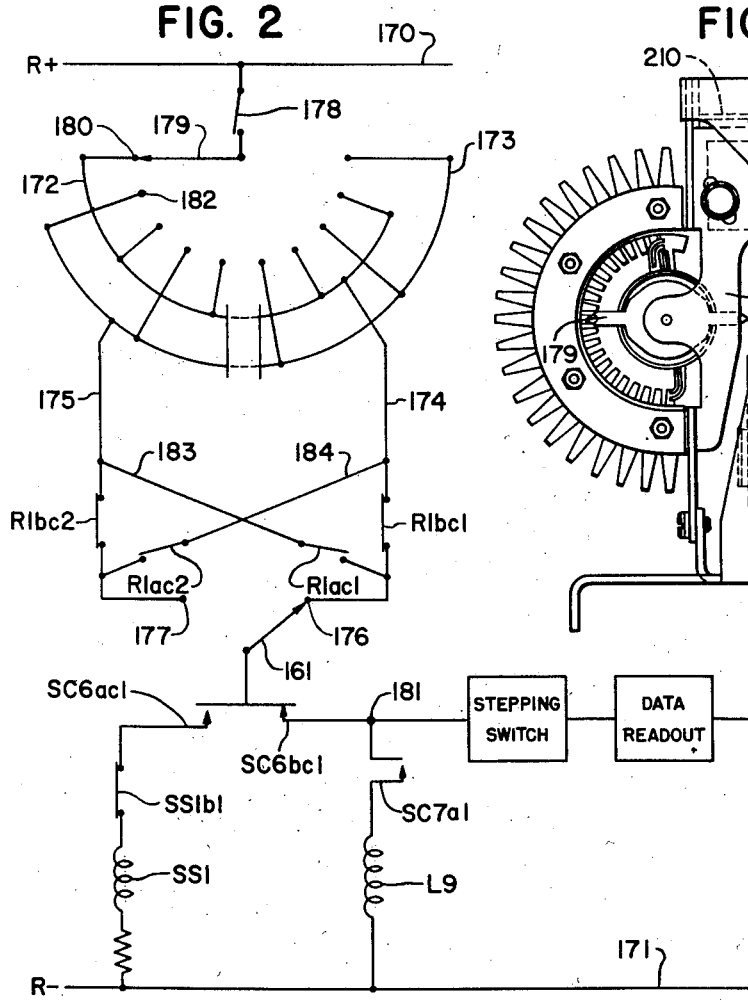
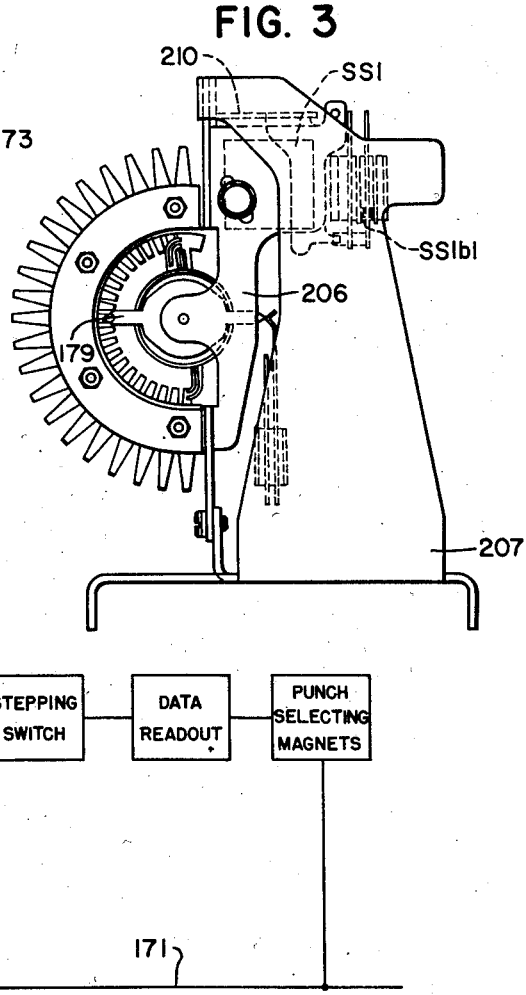
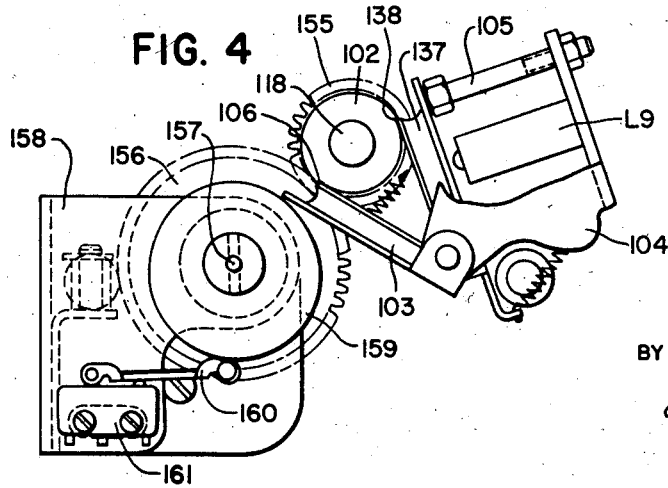
INVENTORS
EDGAR H. SONNANSTINE, JR.
ROBERT H. GRANZOW
BY
THEIR ATTORNEYS

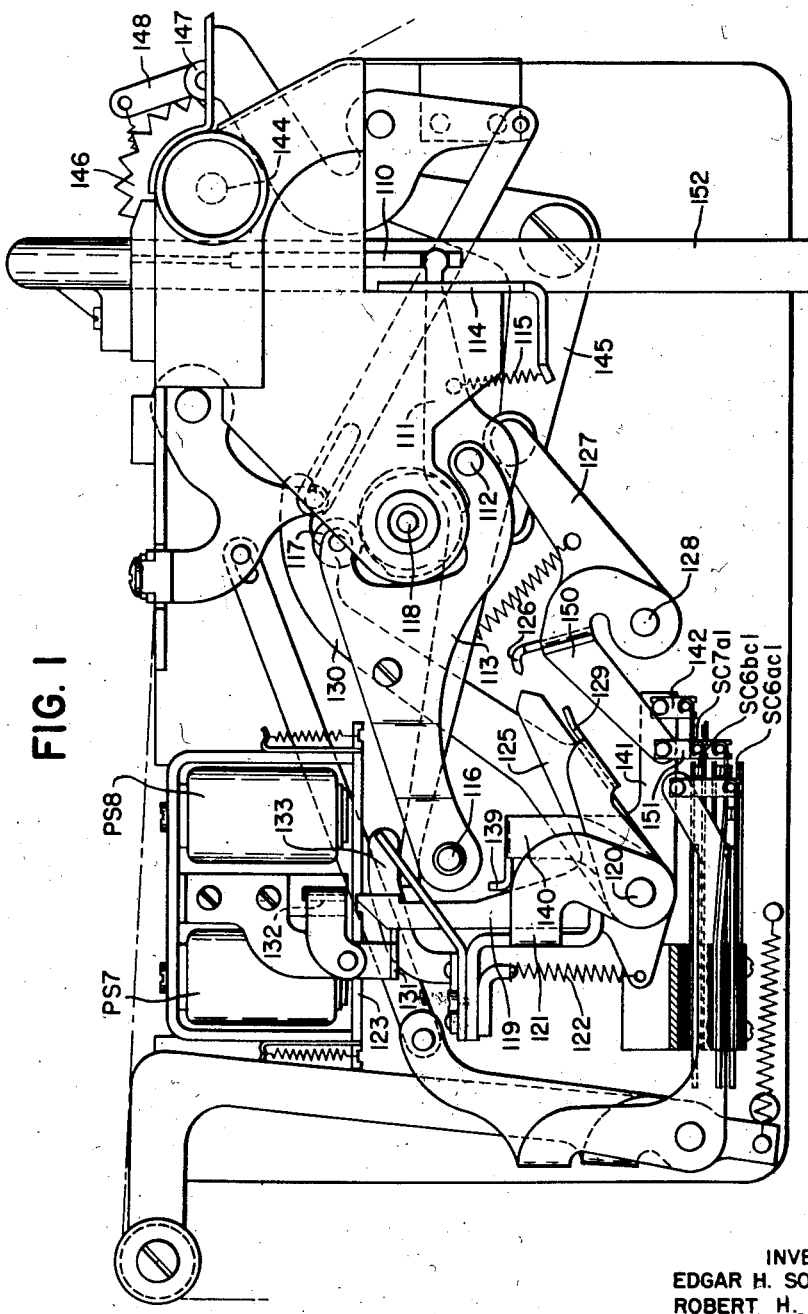

United States Patent Office 2,789,644
Patented Apr. 23, 1957

2,789,644

CONTROL CIRCUIT FOR SEQUENTIALLY OPERATED DEVICE

Edgar H. Sonnanstine, Jr., West Carrollton, and Robert H. Granzow, Miamisburg, Ohio, assignors to The National Cash Register Company, Dayton, Ohio, a corporation of Maryland Application January 27, 1956, Serial No. 561,866

7 Claims. (Cl. 164—115)

This invention relates to an improvement in a control circuit for a sequentially operated device, and particularly to a circuit for operating and controlling a stepping switch of the type which is cocked by the energization of an operating magnet and is stepped upon the deenergization of the magnet.

The novel control circuit is herein shown as forming part of the programming means of a data recording system, but is not to be limited to such a use, since other uses of the invention will readily suggest themselves to one skilled in the art.

Data recording devices which are operatively connected to data input machines of various types for functioning therewith are widely used as components of modern business systems for integrating and processing data. These recording devices normally employ some type of programming means.

One example of a recording system is shown in the application for U. S. Letters Patent of John H. Burns, et al., Serial No. 488,636, filed February 16, 1955. The programming means employed in this system comprises a multiple-level stepping switch and associated circuitry, the multiple levels of the switch enabling a plurality of different programs to be provided, any one of which may be selected for a particular type of operation or transaction.

A circuit for control and operation of such a stepping switch, as well as other stepping switches for the control of various types of sequentially operated utilizing devices, should be designed to minimize the wear on the stepping switch and to prevent malfunctioning thereof, since correct operation of the stepping switch is essential to correct operation of the utilizing device. The controlling and operating circuit of the present invention was therefore developed to eliminate the possibility of erroneous operation and to keep the stepping switch in its proper coordinated relationship to the utilizing device.

As has been stated, the stepping switch in the improved circuit is operated by a magnet, and is of the type which is cocked by energization of the magnet, and is subsequently advanced one step upon de-energization of the magnet. The novel controlling and operating circuit includes a switch means operated by the stepping switch, and a further switch means operated by the utilizing device. In order for a circuit to be completed through these switch means to initiate the next operation of the stepping switch or the utilizing device, as the case may be, the last preceding operations of the stepping switch and the utilizing device must have been in the proper sequence. A retiming switch is provided for changing the relationship of these switch means whenever necessary.

Normally closed interrupter switch means are also provided in the novel circuit through the stepping switch magnet, and are controlled by the armature of said magnet to be opened when the armature is shifted by energization of the magnet, thus causing the magnet to de-energize almost immediately, and to advance the stepping switch to its next position.

One advantage of this circuit is that heating of the stepping switch magnet is minimized, due to the relatively short period the magnet is energized. Also, wear on the stepping switch is reduced, due to reduced momentum of its armature. This reduced momentum of the armature also makes possible a rate of stepping which is faster than would be possible if the magnet remained energized for a longer period of time. Also, by use of this circuit, wear of certain parts in the utilizing device may be greatly reduced. For example, when the novel control circuit is used in a recorder of the type described in the previously mentioned application Serial No. 488,636, wear is greatly lessened on the punch clutch pawl of the recorder, since the timing of the stepping of the stepping switch makes it possible to retract the pawl from declutching position before the single revolution clutch has completed its revolution when consecutive punching operations take place, and thereby eliminates actual contact between the pawl and its cooperating clutch surface except after the last punching operation in the recording of data.

A further advantage is that operation of the stepping switch and the utilizing device will always be properly coordinated because the stepping switch must operate once, but cannot operate more than once between consecutive punching cycles in the recording of data, due to the check means which is built into the novel circuit.

It is, therefore, an object of this invention to provide a stepping switch operating and control circuit such that the stepping switch magnet will be energized only the minimum time necessary to cock the switch for stepping upon de-energization of the magnet.

An additional object is to provide check means to keep the stepping switch in its correct phase relationship to the apparatus with which it is used.

A further object is to provide means for returning the check means to correct timing with respect to the stepping switch whenever necessary.

With these and incidental objects in view, the invention includes certain novel features of construction and combinations of parts, a preferred form or embodiment of which will be hereinafter described with reference to the drawings which accompany and form a part of the specification.

In the drawings:

Fig. 1 is a side elevation of the punching mechanism used in the recorder embodying the present invention.

Fig. 2 is a circuit diagram showing the novel operating and control circuit.

Fig. 3 is a side elevation of the stepping switch to which the invention is applied and which is used to provide the controls in the various punching programs which it is possible to carry out with the recorder.

Fig. 4 is a side elevation showing the clutch and clutch magnet for controlling the cycling of the punching mechanism, and also showing the cam-operated means for controlling the multiple-position checking switch.

GENERAL DESCRIPTION

The novel control circuit described herein may form part of a system for recording in sequential form, on a tape, data derived from data input means, such as a record card or a tag and/or from a key-controlled machine. Such a system may be used, for example, in recording data related to sales of merchandise in a retail establishment on a tape, at the time a sale is made. By thus recording the data for each sale on the tape, as the sale is made, the data for consecutive sales will appear sequentially on the tape, and in such a manner that the tape can readily be used to control computers, or other data processing apparatus, to quickly produce stock control data, sales data, and statistical information or other records which might be desired.

Data is recorded under control of the data input means by operation of a punch mechanism in the recorder, for punching the data on the tape, according to a predetermined code. The sequence in which various types of information are recorded is controlled by a programming means located in the recorder, which includes a stepping switch which steps sequentially through a plurality of positions, each position being capable of causing particular information to be recorded, in accordance with the manner in which the system has been programmed.

In the detailed description which follows, only those portions of the recording system which are pertinent to the present invention will be described in detail. For a detailed description of a representative data recording system as a whole, reference may be had to the previously mentioned application, Serial No. 488,636.

The recorder in which the invention, as herein illustrated, is embodied normally forms a part of a data recording system and is operable to punch record tape with data under control of program control means in the recorder and under control of whatever other data input devices, such as a media reader and/or cash register or accounting machine, may be included in the system. The recorder in turn can control the operation of the data input devices so that they will exert their controls at the proper time. Inter-controls between the recorder and the data input devices prevent the sending of further data to the recorder if the recorder has not recorded data previously sent thereto.

The recorder includes a punching mechanism; a motor for driving the punching mechanism; a clutch for connecting the motor to the punching mechanism; a tape supporting arbor on which a supply of tape can be mounted; a take up reel on which the punched tape can be wound as it is punched; a control relay section which houses control relays used to coordinate the operation of the recorder and the data input devices; a programming means, including a stepping switch and plug board for providing the various programs of punching sequences necessary to coordinate the recording of data in the proper sequence on the tape under control of the data input devices; receptacles for cable connecting means which connect the recorder to the data input devices; and a leader advance push button which is provided at the front of the recorder, and which is effective, when operated, to cause the recorder to operate and perforate the tape with the leader advance pattern of perforations. For a detailed description of the above components of the recorder, reference may be had to the previously mentioned application Serial No. 488,636.

DETAILED DESCRIPTION

*Punching mechanism.*—The punching mechanism, which is shown in Fig. 1, is a tape punching mechanism of the type shown in the United States patent to Francis E. Hamilton et al., No. 2,540,029.

The punching mechanism includes nine punches 110 for punching the rows of perforations across the tape, one for each of the eight channels on the tape, which are used in combinations to encode data, and one for punching the feed holes.

Each operation of the punching apparatus, whether punching data or a leader advance pattern on the tape, causes a feed hole to be perforated in the tape. These feed holes assist in feeding the tape through the punching apparatus and also through the sensing means which analyzes the tape.

The manner in which the punches are selected and operated will now be explained with reference to Fig. 1. Each punch 110 is pivotally connected to the right end of an actuating lever 111, which is pivoted intermediate its ends on a rod 112 in an actuating frame 113. The right ends of the levers 111 are guided in a comb plate 114 and are urged downwardly by springs 115.

The actuating frame 113 is pivoted at 116 and has rollers 117, which engage cams on a cam shaft 118 to rock the actuating frame 113 counter-clockwise from home position and then back to home position to raise and lower the rod 112, upon which the actuating levers 111 are pivoted.

The effectiveness of the actuating levers to operate the punches is controlled by a plurality of magnetically controlled punch selecting levers 119, which are pivoted on a rod 120, carried by a bracket 121 and which are urged clockwise by springs 122. The selecting levers 119 are normally retained in their retracted, or non-effective, position, as shown in Fig. 1, by notches in the armatures 123 of punch selecting magnets such as PS7 and PS8. When any one of the levers 119 is in its retracted position, it is out of engagement with the left end of the corresponding actuating lever 111, and this end is free to rise when the frame 113 raises the rod 112, causing the actuating lever 111 to pivot about its right end, the right end of the actuating lever being loaded by the spring 115. In such an operation the punch 110 will not be operated to punch the tape.

When a punch selecting magnet such as PS7 or PS8 is energized, it moves its armature 123 away from the corresponding punch selecting lever 119, freeing the lever 119 for clockwise movement under the influence of the spring 122 until the end of the selecting lever engages over the left end of the corresponding actuating lever 111 to prevent the left end from rising when the actuating frame 113 raises the rod 112. Since the left end of the actuating lever is positively held by the punch selecting lever against upward movement, the spring 115 will yield when the frame 113 is rocked, and the right end of the actuating lever 111 and the punch 110 will be forced upwardly to perforate the tape. One or more punch selecting magnets may be energized in each punching operation according to the encoding of the symbol or numeral being punched.

Each of the selecting levers 119 has a forwardly extending portion 125, with which a locking plate 126 can engage. The plate 126 is carried by a lever 127, which is pivoted on a rod 128 and is operated by a cam on the shaft 118 to lock the levers from 90 degrees to 230 degrees of the operation of the cam shaft 118, the actual punching portion of the operation of the punching mechanism. When operated, the plate 126 engages the forwardly extending portions 125 of the selecting levers to lock those levers in normal position which have not been released by the punch selecting magnets and to lock those levers in moved position which have been released to select their related punches for operation.

The forwardly extending portions 125 of those levers which have been released and have rocked downwardly will engage a restoring plate 129. The plate 129 is pivoted on the rod 120 and is rocked counter-clockwise by a cam-actuated arm 130 near the end of the punching operation. In order to insure that the selecting levers will be properly restored to the control of the punch selecting magnets such as PS7 and PS8, the restoring plate 129 provides a slight overthrow movement to the levers, and one of the levers engages a flange 131 on one arm of the bail 132 to rock the bail clockwise, which bail forces all the armatures away from the magnets and into engaging relation with the selecting levers.

Since a feed hole is punched in each operation of the machine, regardless of the selection of punches by the magnets, the punch actuating lever 111 for the feed hole punch has its left end blocked against upward movement at all times. An arm 133, which is secured to the bracket 121, extends over the end of the actuating lever to cause the lever to force the punch upwardly in each operation of the punching apparatus.

The punching mechanism is driven by a motor (not shown), which is constantly rotating whenever the recorder is operable, and which is connected by gears (not shown) to the input of a clutch 102 (Fig. 4), which, when tripped, will connect the drive to the cam shaft 118 of the punching mechanism to cause the cam shaft to make one revolution. A punch clutch trip magnet L9 is provided and, when energized, will remove a pawl or block 137 from a projection 138 on the clutch to allow the clutch to operate to drive the punching mechanism.

The punch clutch trip magnet L9 is energized each time one or more of the punch selecting levers 119 is released. A bail 139 (Fig. 1) extends across the selecting levers 119 and is carried by a pair of arms 140 pivoted on the rod 120. One of the arms is formed with an extension 141, which is connected by a link 142 to operate contacts SC7a1. When any one of the punch selecting levers 119 is rocked, upon its release by its related armature 123, it will rock the bail clockwise to close the contacts SC7a1. This will energize the clutch trip magnet L9 to render the clutch effective to connect the motor to the cam shaft 118 to drive it through one revolution.

A retaining pawl or block 103 (Fig. 4) is pivotally supported on the same bracket 104 which supports the punch clutch trip magnet L9, the block 137, and a stop 105 for the block 137. The retaining block 103 cooperates with a projection 106 on the clutch 102 to position the clutch and to prevent undesirable counter-clockwise movement, as viewed in Fig. 4, of the clutch.

Secured to the cam shaft 118 (Fig. 4) of the punching mechanism is a pinion 155 which meshes with a gear 156 secured on a shaft 157 which is mounted on the housing of the punching mechanism and in a bracket 158 fastened to said housing. Also secured on the shaft 157 is a cam 159. Since the pitch diameter of the gear 156 is twice that of the pinion 155, the cam 159 makes one half of a complete revolution each time the punching mechanism cycles. A cam follower 160, operatively connected to a two-position switch 161, is positioned to coact with the periphery of the cam 159 and causes the switch 161, during each cycle of the punching mechanism, to move from one of its positions to the other, so that at the end of each cycle of the punching mechanism the switch will be in one or the other of its positions. The switch 161 forms an integral part of the novel operating and control circuit and its operation therein will be explained fully when the circuit diagram of Fig. 2 is described.

A tape feeding pin wheel (not shown) is mounted on a shaft 144 (Fig. 1) and has, in its periphery, pins which engage the feed holes in the tape to advance the tape after it is punched, the pin wheel being driven by a pawl and ratchet drive (not shown) from a lever 145, which is rocked by a cam on the shaft 118. A detent wheel 146, also mounted on the shaft 144, cooperates with a roller 147 on a lever 148 to accurately position the pin wheel.

An extension 150 on the locking-plate-actuating lever 127 is connected by a link 151 to the contacts SC6ac1 and SC6bc1. At 90 degrees in the operation of the punching mechanism, when the locking plate 126 is rocked to lock the selecting levers 119 in position, the contacts SC6bc1 will be opened, and the contacts SC6ac1 will be closed. These contacts will remain in this condition until 230 degrees of the operation of the punching mechanism, when the lever 127 is rocked to unlock the punch selecting levers, at which time the contacts SC6bc1 will be closed, and the contacts SC6ac1 will be opened. The controls exerted by the contacts SC6ac1 and SC6bc1 will be explained fully when the circuit diagram of Fig. 2 is explained.

The particles of tape which are removed from the tape as perforations are made are guided by a chute 152 to a drawer (not shown), which can be readily removed from the recorder.

*Programming means.*—The programming means includes a stepping switch 206 (Fig. 3) mounted on a supporting bracket 207, secured to the base of the recorder. The stepping switch is shown here as a multiple level, twenty position switch, but could have any desired number of positions and levels. Said switch has a stepping magnet SS1 and the usual spring-urged pawl and ratchet wiper driving means, which is operated by the magnet armature 210 and is conditioned or cocked when the magnet is energized, and is operated and causes the wipers to be advanced when the magnet is de-energized. The armature 210 also operates self-interrupter contacts SS1b1, which are opened when the magnet is energized. The manner in which these contacts exert their control will be explained when the circuit diagram of Fig. 2 is described.

The contacts of one of the levels of the stepping switch are utilized to provide one of the switching means in the novel operating and control circuit. These contacts are connected in the manner shown in the circuit diagram of Fig. 2, wherein alternate contacts are connected together to form two groups of connected contacts, so that, assuming the contacts to be numbered consecutively, one group contains all of the odd numbered contacts while the other group contains all of the even numbered contacts. This wiring arrangement is not shown in Fig. 3, since it would merely complicate the showing of that figure unnecessarily, and is considered to be adequately illustrated in the schematic showing of Fig. 2. The manner in which these two groups of contacts function in the novel operating and control circuit will be explained when the circuit diagram of Fig. 2 is described.

The remaining levels of the stepping switch 206 are used to obtain the necessary controls for the various programs which it may be desired to set up for sequential operation of the data recording system. For a complete description of the programming means, reference may be had to the previously mentioned application Serial No. 488,636.

*Circuit diagram.*—The circuits of the recording system which are pertinent to the instant invention are shown in the circuit diagram of Fig. 2. It will be realized that various interlocking means and other components may be added into this circuit when it is incorporated as part of a data recording system. For a showing of a complete circuit diagram of a representative data recording system, reference may be had to the previously mentioned application Serial No. 488,636.

In order that the explanation of the circuits will be more clear, they will be described as they function in carrying out typical operations of the recorder. In this explanation it will be assumed that the data input devices and the recorder have been previously operated through a complete transaction and are in home position, ready to receive the entries of the new transaction.

Power for the data recording system will normally be turned on by closing a main power switch (not shown), which will make the usual 110 volts 60 cycle A. C. available to the electric motors employed in the system and, through a rectifier (not shown), will supply D. C. operating potential to the control circuit over conductors 170 and 171.

It will be seen that the contacts of the level of the stepping switch 206 shown in Fig. 2 are arranged in the manner previously described, with the odd numbered contacts being connected by a conductor 172 and the even numbered contacts being connected by a conductor 173. In order to avoid needless repetition, not all of the contacts of the particular level of the stepping switch have been shown in Fig. 2. The conductor 172 is connected by a conductor 174 over normally closed contacts R1bc1 of the retiming switch, which will be subsequently described, to terminal 176 of the two-position switch 161, and the conductor 173 is connected by a conductor 175 over normally closed contacts R1bc2 of the retiming switch to terminal 177 of the two-position switch 161.

At a predetermined time in the operation of the system, contacts 178 will be closed by control means in the system to complete a circuit from conductor 170 through the contacts 178, the wiper 179 and contact 180 of one level of the stepping switch 206 shown in its home position in Fig. 2, the conductors 172 and 174, the normally closed retiming contacts R1bc1, the terminal 176, the movable contact of the two-position switch 161 which is controlled by cycling of the punching mechanism, the normally closed contacts SC6bc1, a programming level of the stepping switch 206, and data readout means of the system, the last two being shown in block form in Fig. 2, to energize selected ones of the punch selecting magnets, such as PS7 and PS8, the punch selecting magnets also being shown in block form in Fig. 2.

As has been explained, energization of any one of the punch selecting magnets prepares its corresponding punch 110 for operation, and also causes the contacts SC7a1 to be closed, completing a circuit over a path which is common to the path of the previously described circuit to point 181, and which goes from point 181 through the contacts SC7a1 to energize the punch clutch trip magnet L9, thereby connecting the cam shaft 118 to the recorder motor to cause said cam shaft to be driven through one complete revolution.

It will be recalled that at 90 degrees of the cycle of the punching mechanism, the contacts SC6bc1 are opened, and the contacts SC6ac1 are closed. Opening of the contacts SC6bc1 interrupts the circuits to the punch selecting magnets and to the punch clutch trip magnet L9 and causes these magnets to be de-energized.

At the same time, closing of the contacts SC6ac1 completes a circuit from the conductor 170 through the contacts 178, wiper 179, contact 180, conductors 172 and 174, normally closed contacts R1bc1, terminal 176, the movable contact of the two-position switch 161, contacts SC6ac1, and normally closed interrupter contacts SS1b1, to energize the stepping switch magnet SS1. Energization of the magnet SS1 causes movement of the armature 210 (Fig. 3) to cock the stepping switch 206 for stepping, and to open the self interrupter contacts SS1b1, thus opening the circuit through the magnet SS1 to de-energize said magnet and cause the stepping switch 206 to step in the manner previously described.

Stepping of the wiper 179 of the stepping switch 206 from the position shown in Fig. 2 to its next position prepares a circuit from the conductor 170 through contacts 178, the wiper 179, contact 182 of the stepping switch, conductors 173 and 175, and normally closed contacts R1bc2 to the terminal 177 of the two-position switch 161. However the circuit is interrupted here, since the movable contact of the switch 161 is still positioned at terminal 176 as shown in Fig. 2.

At 230 degrees of the cycle of the punching mechanism, the contacts SC6ac1 are restored to their normally open condition, and the contacts SC6bc1 are restored to their normally closed condition. At about 240 degrees of the cycle, the cam 159 and cooperating follower 160 (Fig. 4) cause the movable contact of the two-position switch 161 to transfer to terminal 177. This completes a circuit from the conductor 170 through the contacts 178, the wiper 179, the contact 182, the conductors 173 and 175, the normally closed contacts R1bc2, the terminal 177, the movable contact of the two-position switch 161, the normally closed contacts SC6bc1, a programming level of the stepping switch 206, and data readout means of the system, to energize selected ones of the punch selecting magnets, such as PS7 and PS8. The operating sequence which has previously been described is then repeated for the next digit or symbol to be punched.

It will be noted that completing the circuit to energize the punch clutch trip magnet L9 at 240 degrees of the cycle of the punching mechanism causes the block 137 (Fig. 4) to be pulled out of the path of the projection 138 on the clutch 102 if another punching operation is to follow, so that the only time the clutch is stopped is after the last punching operation in punching data. This reduces wear on the clutch and block mechanisms, and increases punching speed above the maximum which would be possible if the clutch block 137 were to halt the clutch 102 and the cam shaft 118 after each punching operation. It will be clear from the above description of the circuit of Fig. 2 that the combination of the two-position switch 161 and a level of the stepping switch 206 in which alternate contacts are connected together, provides a checking or timing means which insures that the stepping of the stepping switch and the cycling of the punching mechanism will be in the correct sequential relationship. For example, when the stepping switch has stepped from the position shown in Fig. 2 to the next position, it cannot step again until the punch mechanism cycles to shift the movable contact of the switch 161 from the terminal 176 to the terminal 177, since such a movement of the movable contact of the switch 161 must be made to complete a circuit from conductor 170 to the stepping switch magnet SS1, because the circuit must pass through the contact 182. Similarly, when the movable contact of the switch 161 has shifted to the terminal 177, the cam line 118 cannot operate to shift the movable contact again until the wiper 179 of the stepping switch 206 is stepped from the contact 180 to the contact 182, since such a step is necessary to complete a circuit from conductor 170 to the punch selecting magnet and to the punch clutch trip magnet L9, over the terminal 177.

Means are provided to return the circuit to operative condition when the stepping switch and punching mechanism are not in their proper sequential relation. There are several ways in which the punch mechanism may get out of the proper phase relationship to the stepping switch or vice versa. For example, in leader advance operations the punch mechanism is run without stepping of the stepping switch. It will be seen that each operation of the punching mechanism transfers the movable contact of the switch 161 from one position to another and that at the conclusion the leader advance operation the switch 161 may be "out of phase" with the stepping switch, so that a circuit cannot be completed through the interconnected contacts of the level of the stepping switch and the switch 161. The stepping switch and punching mechanism may also get out of time with respect to each other during a punching of a segment of information. If the segment of information to be punched has an even number of digits, such as eight, for example, when the stepping switch has reached the eighth position, punching will stop and the switch will be reset to its number one position. Due to the fact that the punching mechanism has not moved since causing the last digit or symbol to be punched, it will be "out of phase" with the stepping switch which is now on its number one position, and a circuit cannot be completed through the stepping switch and the switch 161.

The retiming means comprises a switch which may be operated under manual control or by mechanical or electrical means under control of the data recording system, as desired. The retiming switch operates two set of normally closed contacts R1bc1 and R1bc2 in the conductors 174 and 175 respectively and two sets of normally opened contacts R1ac1 and R1ac2 in conductors 183 and 184 respectively, the conductors 183 and 184 extending between the conductors 174 and 175.

Now let it be assumed that, through one of the causes mentioned above, the stepping switch and punching mechanism are not in their proper relationship, so that at the beginning of an operating cycle, the stepping switch wiper is positioned at contact 180 and the movable contact of the switch 161 is positioned at terminal 177. It will be seen that in such an event, a circuit cannot be completed through the switch 161.

The retiming means may be employed in this situation to bring the stepping switch and punching mechanism back into proper relationship by closing the contacts R1*ac*1 and R1*ac*2 and opening the contacts R1*bc*1 and R1*bc*2. The contact 180 and terminal 177 are now electrically connected, as are the contact 182 and terminal 176. The contacts R1*ac*1 and R1*ac*2 will remain closed and the contacts R1*bc*1 and R1*bc*2 will remain open in accordance with the new phase relationship, until another retiming operation is necessary, at which time the contacts R1*bc*1 and R1*bc*2 will close and the contacts R1*ac*1 and R1*ac*2 will open.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. An operating circuit for coordinating the operation of a stepping switch with the operation of a utilizing device, the stepping switch being operable step-by-step to different positions and being of the type which is prepared for operation by energization of a stepping switch magnet and is operated by deenergizing said magnet, comprising the combination of a pair of source terminals whereat a source of potential may be connected; switching means in the stepping switch for preparing alternate circuits in alternate positions of the stepping switch; means operated by the utilizing device for preparing a circuit to connect the stepping switch magnet to one and the other of the alternate circuits at the end of alternate operations of the utilizing device; self interrupting contacts operated by said stepping switch magnet; and control means operated by the utilizing device in each operation thereof to complete an operating circuit between the terminals, over the first and second means and the self interrupting contacts in series with the magnet, to cause the magnet to be energized and open its self-interrupting contacts, causing the stepping switch to step and open the circuit at the first means and prepare the other alternate circuit, said second means being operated to cooperate with said other alternate circuit at the end of the operation of the utilizing device to prepare the stepping switch for operation over this operating circuit in response to a further operation of the control means.

2. An operating circuit for coordinating the operation of a stepping switch with the operation of a utilizing device, the stepping switch being operable step-by-step to different positions and being of the type which is prepared for operation by energization of a stepping switch magnet and is operated by de-energizing said magnet, comprising the combination of a pair of source terminals whereat a source of potential may be connected; switching means in the stepping switch for preparing alternate circuits in alternate positions of the stepping switch; a second pair of terminals related to said alternate circuits; reversible means normally connecting each of said second pair of terminals to its related alternate circuit but operable to reverse the connections to cause the terminals to be connected to the other alternate circuits; means operated by the utilizing device and cooperating with said second pair of terminals for preparing a circuit to connect the stepping switch magnet to one and the other of the alternate circuits at the end of alternate operations of the utilizing device; self-interrupting contacts operated by said stepping switch magnet; and control means operated by the utilizing device in each operation thereof to complete an operating circuit between the terminals, over the first and second means and the self-interrupting contacts in series with the magnet, to cause the magnet to be energized and open its self-interrupting contacts, causing the stepping switch to step and open the circuit at the first means and prepare the other alternate circuit, said second means being operated to cooperate with said other alternate circuit at the end of the operation of the utilizing device to prepare the stepping switch for operation over this operating circuit in response to a further operation of the control means, said reversible means being operable to reverse the connection of said alternate circuit to properly re-establish the operating circuit over the first means and the second means if said circuit has been interrupted by incomplete sequential operation of said first and second means.

3. An operating circuit for coordinating the operation of a stepping switch with the operation of a utilizing device, the stepping switch being operable step-by-step to different positions and being of the type which is prepared for operation by energization of a stepping switch magnet and is operated by de-energizing said magnet, comprising the combination of a pair of source terminals whereat a source of potential may be connected; a control circuit for enabling the stepping switch to control the utilizing device; switching means in the stepping switch for preparing alternate circuits in alternate positionns of the stepping switch; means operated by the utilizing device for preparing a circuit to connect the stepping switch magnet to one and the other of the alternate circuits at the end of alternate operations of the utilizing device and for connecting said control circuit to the same one and the other of the alternate circuits at the end of alternate operations of the utilizing device; self-interrupting contacts operated by the stepping switch magnet; and control means operated by the utilizing device in each operation thereof to interrupt the circuit to the utilizing device and simultaneously to complete an operating circuit between the terminals, over the first and second means and the self-interrupting contacts in series with the magnet, to cause the magnet to de-energize and open its self-interrupting contacts, causing the stepping switch to step and open the circuit at the first means and prepare the other alternate circuit, said second means being operated to cooperate with said other alternate circuit at the end of the operation of the utilizing device to prepare the stepping switch for operation over this operating circuit in response to a further operation of the control means.

4. An operating circuit for coordinating the operation of a stepping switch with the operation of a utilizing device, the stepping switch being operable step-by-step to different positions and being of the type which is prepared for operation by energization of a stepping switch magnet and is operated by de-energizing said magnet, comprising the combination of a pair of source terminals whereat a source of potential may be connected; means in the stepping switch connected to one of said terminals for providing alternate circuits in alternate positions of the stepping switch; a multiple-position switch controlled by operation of the utilizing device and adapted to make contact with alternate ones of the circuits on alternate cycles of operation; a normally closed interrupting switch which is caused to open by energization of the stepping switch magnet; the circuit extending through means in the stepping switch and the multiple-position switch and subsequently dividing into two circuit paths, a first circuit path extending over the interrupting switch and through the magnet to the other source terminal; a second circuit path extending through the utilizing device to said other source terminal; and a switch in each of the two circuit paths, controlled by the utilizing device, the switch in the first circuit path being normally opened, and the switch in the second circuit path being normally closed, whereby application of potential to the source terminals energizes the operating circuit to operate said utilizing device, causing the switch in the second circuit path to be opened to interrupt the circuit to the utilizing device, and causing the switch in the first circuit path to be closed, the magnet thus being energized to cock the stepping switch for stepping, the energization of the magnet opening its self-interrupting switch to de-energize said magnet and advance the stepping switch to its next position, the multiple-position switch being moved from contacting relation to one of the alternate circuits to contacting relation to the other of the alternate circuits to permit the operating circuit to be completed to the utilizing device and the stepping switch magnet for another cycle of operation.

5. An operating circuit for coordinating the operation of a stepping switch with the operation of a utilizing device, comprising the combination of a pair of source terminals whereat a source of potential may be applied; a stepping switch having a plurality of programming levels and a checking level, and a wiper for each level, each level having a plurality of contacts, the odd numbered contacts of the checking level being connected together, the even numbered contacts of the same level also being connected together, means connecting the stepping switch wiper for the checking level to one of said source terminals; a utilizing device controlled by the programming levels of the stepping switch; a multiple-position switch controlled by the utilizing device and having a movable contact adapted to move from a first position in which it is connected to the odd numbered contacts of the checking level of the stepping switch to a second position in which it is connected to the even numbered contacts of the checking level of the stepping switch during one cycle of operation of the utilizing device, and back to said first position during the next succeeding cycle of operation of the utilizing device; a normally open switch controlled by the utilizing device; a normally closed switch also controlled by the utilizing device; a circuit path extending from said multiple-position switch to each of said normally open switch and said normally closed switch; a magnet adapted to be energized for cocking the wipers of the stepping switch for stepping when the magnet is de-energized; interrupter contacts which are normally closed and which are opened by energization of the magnet; an additional circuit path from said normally open switch to the other of said source terminals connecting in series said normally open switch, said magnet, and said interrupter contacts; and a further circuit path from said normally closed switch to said other of said source terminals connecting in series said normally closed switch, a programming level of the stepping switch, and the utilizing device; whereby when the wipers of the stepping switch are in their initial position and current is applied thereto, a circuit will be completed through the checking level of the stepping switch, the multiple-position switch, the normally closed switch and a programming level of the stepping switch to operate the utilizing device, which in turn opens the normally closed switch and closes the normally opened switch to complete a circuit to the stepping switch magnet to energize the magnet for cocking the stepping switch wipers, energization of said magnet also opening the interrupter contacts to deenergize said magnet and advance the stepping switch wipers to the next contact, the utilizing device subsequently closing the normally open switch, opening the normally closed switch, and moving the movable contact of the multiple-position switch from one of its positions to the other, to prepare the operating circuit for another cycle of operation.

6. An operating circuit for controlling the operation of a stepping switch, comprising in combination a pair of source terminals whereat a source of potential may be connected; a common path connected to one of said terminals; a stepping switch connected in the common path having a wiper, a first set of alternate contacts connected to a first conductor, and a second set of alternate contacts connected to a second conductor; a multiple-position switch connected in the common path and adapted to contact said first conductor or said second conductor, a first circuit path connected between the multiple position switch and the other terminal; a stepping switch magnet, normally closed self-interrupting contacts, and a normally open switch connected in series in said first circuit path; a second circuit path connected between said multiple-position switch and said other terminal; a normally closed switch, a set of normally open contacts, and a cycling control magnet being connected in series in the second path; a third circuit path extending from a point between the normally closed contacts and the normally open contacts to said other terminal; data input means, data programming means, and a tape punching unit being connected in series in said third path; means operable by the tape punching unit to control the opening and closing of the normally open contacts, and means controlled by the cycling control magnet to control the opening and closing of said normally open switch and said normally closed switch, and to control the positioning of said multiple-position switch, whereby application of potential to said source terminals is effective to cause an electrical circuit to be completed over said common path and said third path to prepare the tape punching unit for operation, the preparation of said tape punching unit in turn being effective to close the normally open contacts to complete a circuit over said second path to energize the cycling control magnet, which in turn is effective to operate said tape punching unit, and to cause said normally closed switch to be opened and said normally open switch to be closed, thus interrupting the circuit through said second and third paths and completing a circuit through the common path and said first path to energize the stepping switch magnet for cocking of the stepping switch, the energization of the stepping switch magnet opening its self-interrupting contacts to de-energize said stepping switch magnet and advance the stepping switch wiper to its next position, thus interrupting the circuit through the common path, the normally open switch being subsequently re-opened and the normally closed switch being subsequently re-closed by said means controlled by the cycling control magnet, and the multiple position switch then being transferred to its other position by said means controlled by the cycling control magnet, to prepare the operating circuit for another cycle of operation.

7. An operating circuit for coordinating the opertion of a stepping switch with the operation of a utilizing device, comprising the combination of a pair of source terminals whereat a source of potential may be applied; a stepping switch having a plurality of programming levels and a checking level, and a wiper for each level, each level having a plurality of contacts, a first set of alternate contacts of the checking level being connected to a first conductor, and a second set of alternate contacts of the checking level being connected to a second conductor; means connecting the stepping switch wiper for the checking level to one of said source terminals; a second pair of terminals related to the first and second conductors; reversible means normally connecting each terminal to its related conductor but operable to reverse the connection to cause each terminal to be connected to the other alternate conductor; a multiple-position switch controlled by the utilizing device and having a movable contact adapted to move from one to the other of said second pair of terminals during one complete cycle of operation of the utilizing device, and back to said one of said terminals during the next succeeding cycle of operation of the utilizing device; a normally open switch controlled by the utilizing device; a normally closed switch also controlled by the utilizing device; a circuit path extending from said multiple-position switch to each of said normally open switch and said normally closed switch; a magnet adapted to be energized for cocking the wipers of the stepping switch for stepping when the magnet is de-energized; interrupter contacts which are normally closed and which are opened by energization of the magnet; an additional circuit path from said normally open switch to the other of said source terminals connecting in series said normally open switch, said magnet and said interrupter contacts; and a further circuit path from said normally closed switch to said other of said source terminals connecting in series said normally closed switch, a programming level of the stepping switch, and the utilizing device; whereby when the wipers of the stepping switch are in their initial position and current is applied thereto, a circuit will be completed through the checking level of the stepping switch, the multiple-position switch, the normally closed switch, and a programming level of the stepping switch to operate the utilizing device, which in turn opens the normally closed switch and closes the normally opened switch to complete a circuit to the stepping switch magnet to energize the magnet for cocking the stepping switch wipers, energization of said magnet also opening the interrupter contacts to de-energize said magnet and advance the stepping switch wipers to the next contact, the utilizing device subsequently closing the normally open switch, opening the normally closed switch, and moving the movable contact of the multiple-position switch from one of said second pair of terminals to the other, to prepare the operating circuit for another cycle of operation, said reversible means being operable to reverse the connection of said alternate conductors and said second pair of terminals to properly re-establish the operating circuit over the multiple-position switch if said circuit has been interrupted by incomplete sequential operation of the stepping switch and the multiple-position switch.

No references cited.